United States Patent
Hernandez-Oliver

(10) Patent No.: US 10,036,653 B2
(45) Date of Patent: Jul. 31, 2018

(54) RELATIVE ANGLE SENSOR

(71) Applicant: TYCO ELECTRONICS CORPORATION, Berwyn, PA (US)

(72) Inventor: Salvador Hernandez-Oliver, Kernersville, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 367 days.

(21) Appl. No.: 14/870,143

(22) Filed: Sep. 30, 2015

(65) Prior Publication Data

US 2016/0097655 A1    Apr. 7, 2016

Related U.S. Application Data

(60) Provisional application No. 62/060,269, filed on Oct. 6, 2014.

(51) Int. Cl.
| | |
|---|---|
| *G01D 5/12* | (2006.01) |
| *G01B 7/30* | (2006.01) |
| *G01D 5/14* | (2006.01) |
| *G01D 5/20* | (2006.01) |

(52) U.S. Cl.
CPC ............... *G01D 5/12* (2013.01); *G01B 7/30* (2013.01); *G01D 5/145* (2013.01); *G01D 5/2013* (2013.01)

(58) Field of Classification Search
CPC .................................. G01D 5/12; G01B 7/30
USPC .................................................... 324/207.25
See application file for complete search history.

(56) References Cited

U.S. PATENT DOCUMENTS

| | | | |
|---|---|---|---|
| 8,335,659 B2 | 12/2012 | Hernandez-Oliver | |
| 2003/0233889 A1 | 12/2003 | Nakane et al. | |
| 2004/0251893 A1* | 12/2004 | Takahara | F02D 11/106 |
| | | | 324/207.2 |
| 2004/0261546 A1* | 12/2004 | Wilczek | G01D 3/022 |
| | | | 73/862.333 |
| 2010/0039106 A1* | 2/2010 | Edelstein | G01R 33/028 |
| | | | 324/253 |

FOREIGN PATENT DOCUMENTS

| | | |
|---|---|---|
| DE | 198 00 403 A1 | 7/1999 |
| EP | 2 020 590 A2 | 2/2009 |

(Continued)

OTHER PUBLICATIONS

International Search Report, International Application No. PCT/US2015/053489, International Filing Date, Oct. 1, 2015.

*Primary Examiner* — Reena Aurora

(57) ABSTRACT

A relative angle sensor includes a stator unit, a magnet unit, and a collector unit. The stator unit includes a stator shaft coupled to and disposed between an upper stator ring and a lower stator ring. Each of the stator rings includes a plurality of teeth with slots defined between adjacent teeth. The stator unit defines a channel between the upper and lower stator rings and outside of the stator shaft. The magnet unit is disposed in the channel and includes at least one magnet. The magnet unit and/or the stator unit is configured to rotate relative to the other of the magnet unit or the stator unit. The collector unit is configured to receive magnetic flux routed from the magnet unit. The magnetic flux routed through the collector unit is responsive to a relative rotational position between the magnet unit and the stator unit.

20 Claims, 6 Drawing Sheets

(56) References Cited

FOREIGN PATENT DOCUMENTS

| FR | 2 872 896 A1 | 1/2006 |
|----|--------------|--------|
| JP | 2013 195108 A | 9/2013 |
| WO | 2013085174 | 6/2013 |

* cited by examiner

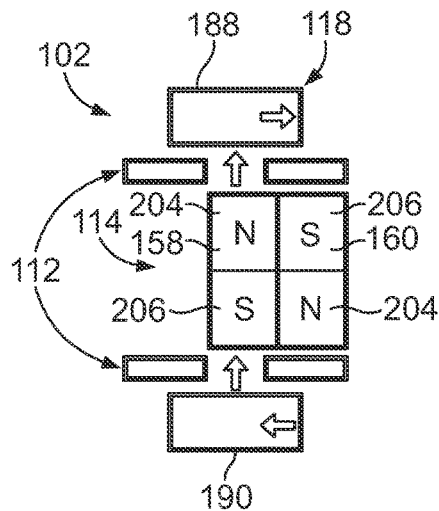
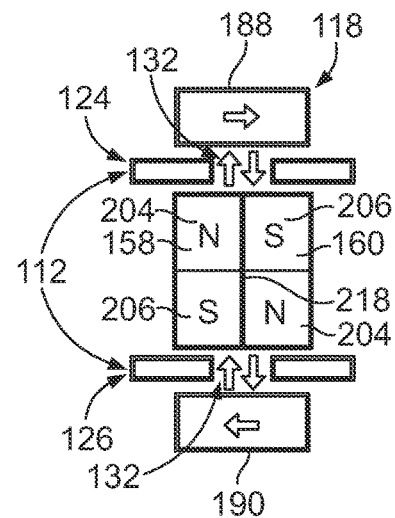
FIG. 5A          FIG. 5B
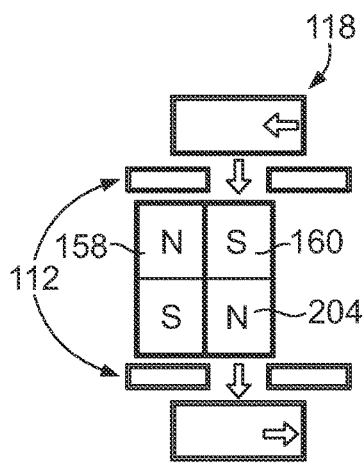
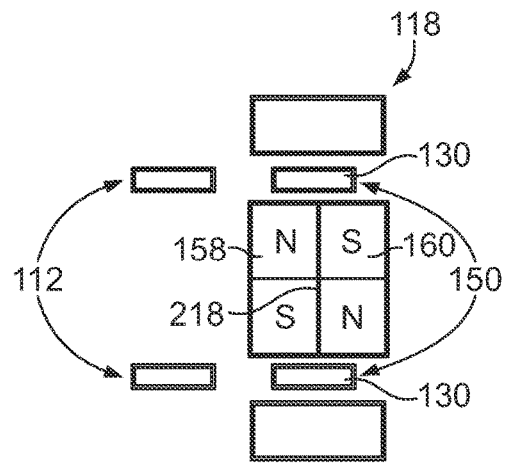
FIG. 5C          FIG. 5D

RELATIVE ANGLE SENSOR

CROSS-REFERENCE TO RELATED APPLICATIONS

This application claims priority to U.S. Provisional Application No. 62/060,269, filed 6 Oct. 2014, which is incorporated by reference in its entirety.

BACKGROUND OF THE INVENTION

The subject matter herein relates generally to sensors for detecting relative angles between two or more components.

Relative angle sensors, also referred to as angular position sensors and rotary position sensors, are used in various automotive and industrial sensing applications, such as electronic power steering systems, throttle position systems, fuel tank float-level systems, power seat and power mirror systems, flow meter systems, robotic systems, and the like. For example, in automotive electronic power steering systems, relative angle sensors are used to detect an amount of torsion (or a shift angle) between an input shaft coupled directly or indirectly to a steering wheel and an output shaft coupled direction or indirectly to a wheel of an automobile. Since the wheel is in contact with a road surface, friction between the wheel and the road causes a difference in a rotational angle (or a relative angle) between the input shaft coupled to the steering wheel and the output shaft coupled to the wheel during a turn, for example. Electronic power steering systems include relative angle sensors to measure or detect the relative angle of the shafts. The electronic power steering systems further include an electric motor or another power unit that supplies a supplemental rotational force to the output shaft coupled to the wheel. The amount of rotational force supplied to the output shaft may correspond to the measured relative angle in order to compensate for the amount of rotational lag or deflection experienced by the output shaft, with the result that the automobile may be safely and accurately steered in a desired direction.

Some known relative angle sensors include a stator divided into separate upper and lower parts connected to a first shaft, and a magnetic rotor located between the upper and lower stator parts and connected to a second shaft. The stator parts are used to route magnetic flux through a collector unit that provides a path for magnetic flux to be routed across and measured by a sensor on the collector unit. The angle sensors may be relatively complex, since each of the separate and discrete upper and lower stator parts must be mounted to the same first shaft. In addition, the upper and lower stator parts may have protrusions that must be staggered or otherwise spaced apart at precise pre-defined distances, which further complicates separately installing the upper and lower stator parts to the first shaft. A need remains for a relative angle sensor that is less complex and functions accurately to measure a relative rotational position of a first shaft and a second shaft.

BRIEF DESCRIPTION OF THE INVENTION

In an embodiment, a relative angle sensor includes a stator unit, a magnet unit, and a collector unit. The stator unit includes a stator shaft oriented about a center axis. The stator shaft is coupled to and disposed between an upper stator ring and a lower stator ring. The stator unit defines a channel between the upper and lower stator rings and radially outside of the stator shaft. Each of the upper and lower stator rings includes a plurality of teeth with slots defined between adjacent teeth. The magnet unit includes at least one magnet. The magnet unit is disposed in the channel. At least one of the magnet unit or the stator unit is configured to rotate about the center axis relative to the other of the magnet unit and the stator unit. The collector unit is configured to receive magnetic flux routed from the magnet unit. At least one of a magnitude or a direction of the magnetic flux routed through the collector unit from the magnet unit is responsive to a relative rotational position between the magnet unit and the stator unit.

In another embodiment, a relative angle sensor includes a stator unit, a magnet unit, and a collector unit. The stator unit includes a stator shaft oriented about a center axis. The stator shaft is coupled to and disposed between an upper stator ring and a lower stator ring. The stator unit defines a channel between the upper and lower stator rings and radially outside of the stator shaft. Each of the upper and lower stator rings includes a plurality of radially-extending teeth with slots defined between adjacent teeth. The teeth of the upper stator ring are aligned in pairs with the teeth of the lower stator ring. The magnet unit includes plural magnets including a first magnet and a second magnet that are each polarized in an axial direction. The first magnet is adjacent to the second magnet and has an opposite polarity as the second magnet. The magnet unit is disposed in the channel. At least one of the magnet unit or the stator unit is configured to rotate about the center axis relative to the other of the magnet unit and the stator unit. The collector unit is configured to receive magnetic flux routed from the magnet unit. At least one of a magnitude or a direction of the magnetic flux routed through the collector unit from the magnet unit is responsive to a relative rotational position between the magnet unit and the stator unit.

BRIEF DESCRIPTION OF THE DRAWINGS

FIGS. 5A-5D are additional schematic diagrams of the relative angle sensor according to an embodiment.

DETAILED DESCRIPTION OF THE INVENTION

Figure 1:
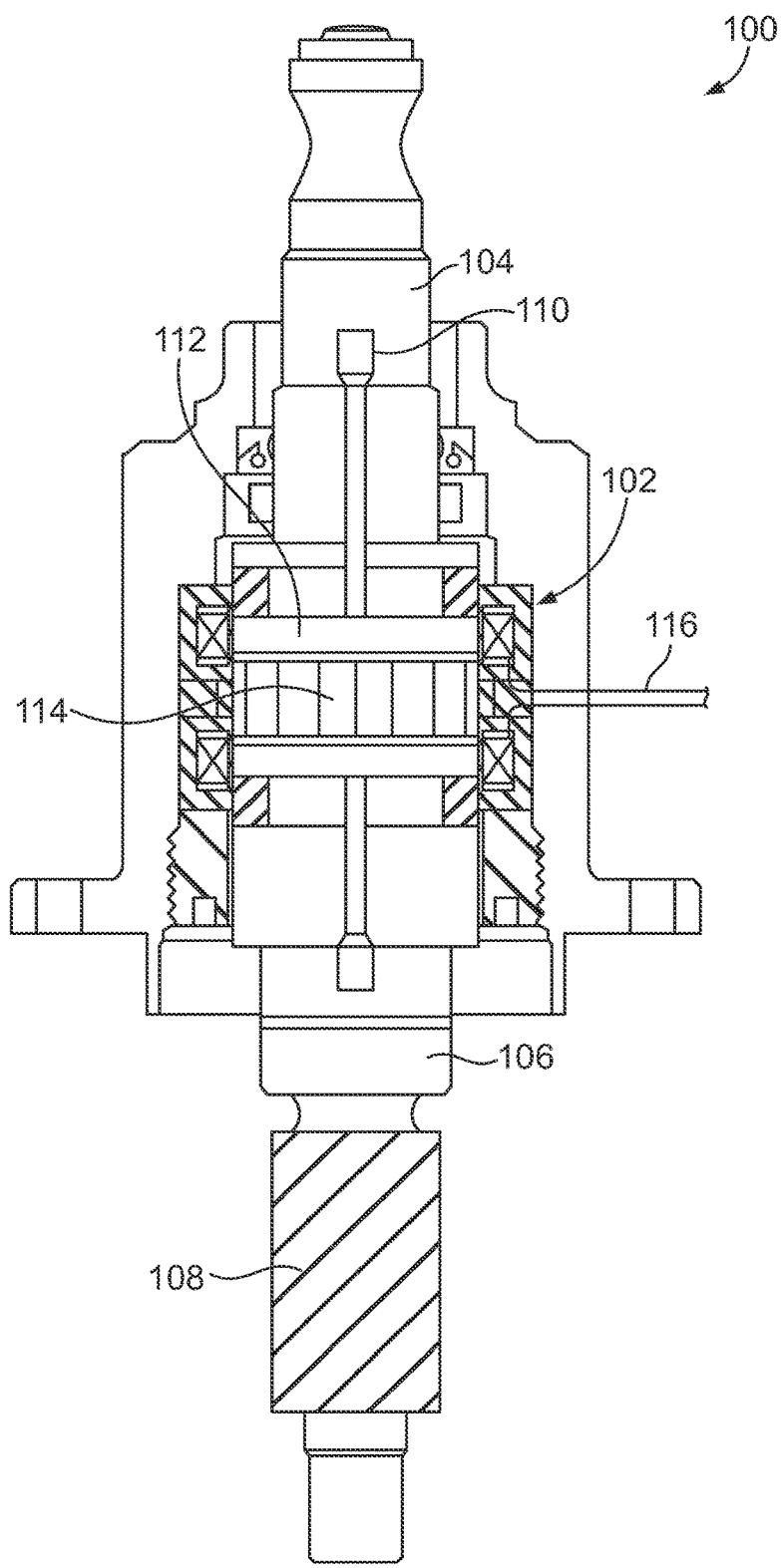
FIG. 1 is a cross-sectional view of a relative position detection system that includes a relative angle sensor according to an embodiment.

FIG. 1 is a cross-sectional view of a relative position detection system 100 that includes a relative angle sensor 102 according to an embodiment. The relative position detection system 100 may be used in various automotive and industrial applications to detect relative rotational positions between two components, including detecting induced rotational angles when relative movement occurs between the two components. As one non-limiting example, the relative position detection system 100 shown in FIG. 1 is described as part of an electronic power steering (EPS) system. The relative position detection system 100 further includes a first shaft 104 and a second shaft 106. The first shaft 104 may couple to a steering wheel, such that the first shaft 104 rotates when an operator rotates the steering wheel. The first shaft 104 thus may be an input shaft. The second shaft 106 may be coupled to a pinion gear 108 that intermeshes with a rack bar of a tie rod of a wheel, such that rotation of the second shaft 106 causes translation of the tie rod, which turns the wheel. Thus, the second shaft 106 may be an output shaft. The relative position detection system 100 also includes a torsion bar 110 that is coupled to both the first and second shafts 104, 106. The torsion bar 110 provides a mechanical link between the input shaft and the output shaft that relays a force from the first shaft 104 that was input at the steering wheel to the second shaft 106 for an output of turning the wheel. The torsion bar 110 is coaxial to the first and second shafts 104, 106. The first and second shafts 104, 106 are coaxial to each other. As described above, since the wheel is in contact with a road surface, friction and/or mechanical obstructions between the wheel and the road (and friction in the mechanical connections between the steering wheel and the wheel) cause the torsion bar 110 to twist or deflect, which results in a difference in rotational angle (or a relative angle) between the first and second shafts 104, 106.

The relative angle sensor 102 is configured to detect a relative rotational position between the first shaft 104 and the second shaft 106. For example, the relative angle sensor 102 includes a stator unit 112 and a magnet unit 114. The stator unit 112 is coupled to the first shaft 104 or the second shaft 106, and the magnet unit 114 is coupled to the other of the first and second shafts 104, 106. The stator unit 112 and the magnet unit 114 are fixedly coupled to the corresponding shafts 104, 106, such that the stator and magnet units 112, 114 each rotate as the corresponding shaft 104 or 106 rotates. Based on a relative rotational position between the stator unit 112 and the magnet unit 114, the relative angle sensor 102 is configured to detect the relative rotational position between the first shaft 104 and the second shaft 106. The relative angle sensor 102 may transmit information, in the form of one or more electrical signals, about the relative rotational position between the first and second shafts 104, 106 to a controller, such as an electronic control unit (not shown), along a wired pathway 116. The electronic control unit analyzes the received electrical signal(s) and controls an output of an auxiliary power unit (not shown) in response. The auxiliary power unit is coupled to the second shaft 106 and may be controlled to apply a rotational force on the second shaft 106 to overcome the resistance (such as friction) encountered by the wheel on the road surface and the deflection of the torsion bar 110.

Figure 2:
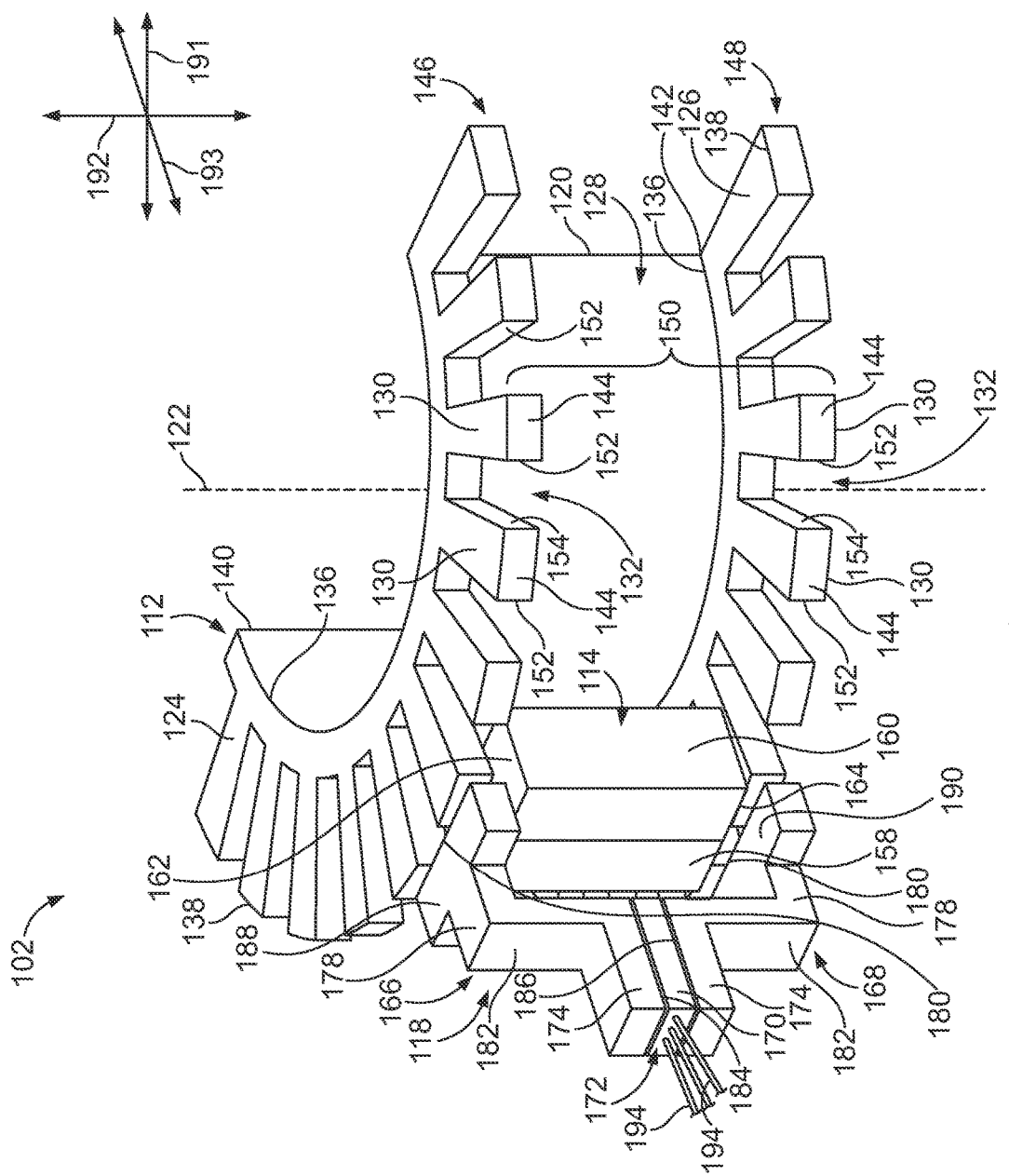
FIG. 2 is a perspective view of the relative angle sensor according to an exemplary embodiment.

FIG. 2 is a perspective view of the relative angle sensor 102 according to an exemplary embodiment. The relative angle sensor 102 includes the stator unit 112, the magnet unit 114, and a collector unit 118. The stator unit 112 includes an upper stator ring 124 and a lower stator ring 126 that are both coupled to a stator shaft 120, with connects the upper and lower stator rings 124, 126 together. As used herein, relative or spatial terms such as "upper," "lower," "front," "rear," "left," and "right" are only used to distinguish the referenced elements and do not necessarily require particular positions or orientations in the relative angle sensor 102 relative to gravity or in the surrounding environment of the relative angle sensor 102. The upper and lower stator rings 124, 126 are rotatably fixed together via the stator shaft 120, such that the components of the stator unit 112 do not rotate relative to each other. As described above with reference to FIG. 1, the stator unit 112 may be connected to the first shaft 104 or the second shaft 106 as the relative angle sensor 102 is installed in the relative position detection system 100. By fixing the upper and lower stator rings 124, 126 together, the stator unit 112 may be mounted to the corresponding shaft as one integral component. The relative angle sensor 102 thus avoids a recognized problem in known relative angle sensors, which is the complexity at mounting two discrete stator components to the same shaft at a predefined relative orientation and spacing.

The upper and lower stator rings 124, 126 of the stator unit 112 each include a plurality of teeth 130. The teeth 130 define slots 132 that extend between adjacent teeth 130. The magnet unit 114, which includes at least one magnet, is disposed between the upper and lower stator rings 124, 126. The collector unit 118 is configured to receive magnetic flux that is routed from the magnet unit 114. As described further herein, although the collector unit 118 is "configured to" receive magnetic flux from the magnet unit 114, the collector unit 118 does not necessarily always receive magnetic flux from the magnet unit 114. For example, in some angular positions or orientations of the magnet unit 114 relative to the stator unit 112, the magnetic flux from the magnet unit 114 may be routed away from the collector unit 118 such that the collector unit 118 does not receive magnetic flux. In an exemplary embodiment, the collector unit 118 receives magnetic flux from the magnet unit 114 that is routed across the slots 132. On the other hand, magnetic flux that is routed from the magnet unit 114 through the teeth 130 of the stator unit 112 is not received by the collector unit 118. Instead, the magnetic flux through the teeth 130 is routed along the stator shaft 120. The teeth 130 of the stator unit 112 therefore blocks magnetic flux from being received at the collector unit 118. The magnitude and/or direction of magnetic flux routed through the collector unit 118 therefore depends on the relative rotational position of the magnet unit 114 and the stator unit 112. In contrast to the embodiments described herein, the stator unit in some known relative angle sensors is used to direct or guide magnetic flux to and from the collector unit, not block magnetic flux from being received at the collector unit by routing the flux away from the collector unit. The relative angle sensor 102 and routes of magnetic flux through the relative angle sensor 102 are described in more detail below.

The stator shaft 120 is oriented about or along a center axis 122. The relative angle sensor 102 is oriented with respect to a lateral axis 191, an elevation axis 192, and a longitudinal axis 193. The axes 191-193 are mutually perpendicular with respect to one another. Although the elevation axis 192 appears to extend in a vertical direction parallel to gravity in FIG. 1, it is understood that the axes 191-193 are not required to have any particular orientation with respect to gravity. The center axis 122 is parallel to the elevation axis 192.

The stator shaft 120 extends between the upper and lower stator rings 124, 126. The stator unit 112 defines a channel 128 between the upper and lower stator rings 124, 126 and radially outside of the stator shaft 120. The stator shaft 120 is curved. For example, the curve of the stator shaft 120 may be circular (closed or open, although the curve is shown open in FIG. 2), parabolic, elliptical (closed or open), hyperbolic, or the like. In the illustrated embodiment, the stator shaft 120 is cylindrical, such that all areas of the shaft 120 are equidistant from the center axis 122. The upper and lower stator rings 124, 126 are also curved, and each define an inside arc 136 and an outside arc 138. The arcs 136, 138 may be curved similarly to the stator shaft 120. The inside arc 136 of each of the upper and lower stator rings 124, 126 is coupled to the stator shaft 120. For example, the inside arc 136 of the upper stator ring 124 is coupled to a top 140 of the stator shaft 120, and the inside arc 136 of the lower stator ring 126 is coupled to a bottom 142 of the stator shaft 120. Optionally, the upper and lower stator rings 124, 126 may be integrally formed with the stator shaft 120 as a unitary component, such that the upper and lower stator rings 124, 126 extend from the top 140 and bottom 142 of the stator shaft 120, respectively. The outside arcs 138 of the upper and lower stator rings 124, 126 are defined by distal edges 144 of the teeth 130. The distal edges 144 are the edges of the teeth 130 that are farthest from the center axis 122. The slots 132 of each of the upper and lower stator rings 124, 126 extend from the outside arcs 138 toward the inside arcs 136.

The teeth 130 of the upper stator ring 124 are arranged in a row 146 that extends circumferentially around the center axis 122. The teeth 130 of the lower stator ring 126 are also arranged in a row 148 that extends circumferentially around the center axis 122. The rows 146, 148 may be parallel to each other. In an embodiment, the teeth 130 of each of the upper and lower stator rings 124, 126 extend radially outward relative to the center axis 122. The teeth 130 of the upper stator ring 124 optionally may be aligned with the teeth 130 of the lower stator ring 126 in pairs 150 that include one tooth 130 from each of the stator rings 124, 126. The two teeth 130 in each pair 150 are aligned along both the lateral axis 191 and the longitudinal axis 193, but are spaced apart axially along the elevation axis 192 (or the center axis 122). Each tooth 130 has a left edge 152 and a right edge 154. Each slot 132 is defined between the right edge 154 of a first tooth 130 and the left edge 152 of an adjacent tooth 130 to the right of the first tooth 130. The slots 132 of the upper and lower stator rings 124, 126 are aligned in sets in embodiments in which the teeth 130 are aligned in pairs 150. Optionally, all of the teeth 130 may have identical or at least similar sizes (for example, lengths and widths) and shapes as each other. In addition, the slots 132 may have identical or at least similar sizes and shapes as each other.

In an embodiment, the stator unit 112 is formed of a ferrous material, such as a metal or metal alloy containing iron. The ferrous properties allow the stator unit 112 to provide a route for magnetic flux through the stator unit 112.

The magnet unit 114 includes at least one magnet. The magnet unit 114 may include discrete magnets or a ring of magnets, such as a magnetic rotor. The magnet unit 114 is disposed in the channel 128 of the stator unit 112. The magnet unit 114 is configured to rotate or otherwise move around the center axis 122 within the channel 128 relative to the stator unit 112. Likewise, the stator unit 112 is configured to rotate around the center axis 122 relative to the magnet unit 114. Thus, the relative angle sensor 102 may be configured to detect a change in the relative rotational position when the stator unit 112 moves but the magnet unit 114 is stationary, when the magnet unit 114 moves but the stator unit 112 is stationary, and when both the stator unit 112 and the magnet unit 114 move, as long as there is relative movement (meaning that both units 112, 114 do not move the same amount and direction at the same time). In an embodiment, although the magnet unit 114 is within the channel 128, the magnet unit 114 does not mechanically contact the stator unit 112, and vice-versa. Since the stator and magnet units 112, 114 do not make contact, the detected relative rotational position between the stator and magnet units 112, 114 is not affected or compromised by friction. The lack of contact may also increase the life of the relative angle sensor 102 by avoiding damage from contact forces.

In the illustrated embodiment, the magnet unit 114 includes a first magnet 158 and a second magnet 160. The first and second magnets 158, 160 are stacked adjacent to each other along the lateral axis 191. The magnets 158, 160 may be stacked circumferentially in a ring shape that corresponds to the curve of the channel 128. In an embodiment, the first and second magnets 158, 160 are polarized in an axial direction, such that the north and south poles of each magnet 158, 160 are axially spaced from each other along the elevation axis 192 (or the center axis 122). The polarity of the first magnet 158 is opposite the polarity of the second magnet 160. For example, the north pole of the first magnet 158 may be adjacent to the south pole of the second magnet 160 at a top end 162 of the magnet unit 114. In addition, the south pole of the first magnet 158 is adjacent to the north pole of the second magnet 160 at a bottom end 164 of the magnet unit 114 that is opposite the top end 162. Although only two magnets 158, 160 are shown in FIG. 2, the relative angle sensor 102 in other embodiments includes one magnet or more than two magnets. The three or more magnets may have axial polarities that alternate as shown in FIG. 2. In other embodiments, the one or more magnets of the magnet unit 114 may have polarities oriented in a lateral or circumferential direction, such as along the lateral axis 191.

The collector unit 118 includes an upper collector arm 166, a lower collector arm 168, and a magnetic field sensor 170. The upper and lower collector arms 166, 168 are configured to route magnetic flux across the magnetic field sensor 170, and the magnetic field sensor 170 is configured to detect the magnitude and direction of the magnetic flux. The upper collector arm 166 is separated from the lower collector arm 168 by a sensing area 172. The magnetic field sensor 170 is disposed in the sensing area 172. The upper and lower collector arms 166, 168 may have angular s-shapes that include a horizontal beam or platform 174, a horizontal branch 178, and an upright section 182 therebetween. The horizontal beam 174 of the upper collector arm 166 defines a ceiling 184 of the sensing area 172, and the horizontal beam 174 of the lower collector arm 168 defines a floor 186 of the sensing area 172. Optionally, the collector unit 118 may be rotationally fixed to the magnet unit 114 or the stator unit 112 such that the collector unit 118 rotates with the corresponding one of the magnet unit 114 or the stator unit 112. Alternatively, the collector unit 118 may not be rotationally fixed to either of the magnet unit 114 or the stator unit 112.

The upper and lower collector arms 166, 168 are formed of a ferrous material, such as a metal or metal alloy containing iron. The ferrous properties allow the collector arms 166, 168 to route magnetic flux through the collector unit 118 and across the sensing area 172 for detection by the magnetic field sensor 170. For example, magnetic flux may be routed through the upper collector arm 166 first, such that the flux is routed from the horizontal branch 178 through the upright section 182 and then through the horizontal beam 174 before extending across the sensing area 172. The magnetic flux then continues through the horizontal beam 174 of the lower collector arm 168 through the upright section 182 and then through the horizontal branch 178 before exiting the collector unit 118 and entering the south pole of one of the magnets of the magnet unit 114. Magnetic flux routed in an opposite direction traverses through the collector unit 118 through the lower collector arm 168, then across the sensing area 172, and finally through the upper collector arm 166. As used herein, magnetic flux may be referred to as if magnetic flux physically moves or flows, like electric current. However, it is recognized that magnetic flux does not actually move or flow, and the reference to such movement is for descriptive purposes only to show the direction and density of the magnetic field produced by the magnet unit 114 in and along the relative angle sensor 102. In other embodiments, the collector arms 166, 168 may not form s-curves with two horizontal portions and one upright portion as described above.

In an embodiment, a distal end 180 of the upper collector arm 166 (at the horizontal branch 178) includes an elongated first or upper bar 188. Likewise, the distal end 180 of the lower collector arm 168 (at the horizontal branch 178) includes an elongated second or lower bar 190. The bars 188, 190 are configured to collect magnetic flux from the magnet unit 114 and route the magnetic flux through the respective arms 166, 168 to the magnetic field sensor 170 in the sensing area 172. The bars 188, 190 may extend laterally outward from the horizontal branches 178 of the arms 166, 168. For example, the horizontal branches 178 extend radially relative to the center axis 122, and the upper and lower bars 188, 190 extend laterally, forming a t-shape, that increases the width of the collector arms 166, 168 at the distal ends 180. The upper bar 188 is disposed proximate to the upper stator ring 124. More specifically, the upper bar 188 is proximate to the outside arc 138 of the upper stator ring 124. As shown in FIG. 2, the upper bar 188 may be aligned axially (or coplanar) with the upper stator ring 124 but disposed radially outside of the upper stator ring 124. Alternatively, in one or more embodiments at least part of the upper bar 188 is disposed axially above the upper stator ring 124 such that the upper stator ring 124 is located between the upper bar 188 and the magnet unit 114. Since the upper bar 188 is above the magnet unit 114 and the upper stator ring 124, magnetic flux routed upward from the magnet unit 114 must extend through the slots 132 to be received in the upper bar 188. Similarly to the upper bar 188, the lower bar 190 is disposed proximate to the lower stator ring 126, and may be radially outside of the lower stator ring 126 or axially below the lower stator ring 126, such that the lower stator ring 126 is disposed between the lower bar 190 and the magnet unit 114.

The magnetic field sensor 170 is configured to convert the magnetic flux that is routed through the collector unit 118 and detected by the magnetic field sensor 170 into one or more electrical signals. The one or more electrical signals depend on the magnitude and/or direction of the magnetic flux through the collector unit 118. The magnitude and the direction of the magnetic flux are based on the relative rotational position between the magnet unit 114 and the stator unit 112. Thus, a change in the relative rotational position between the magnet unit 114 and the stator unit 112 changes the magnetic flux, which changes the one or more electrical signals generated by the magnetic field sensor 170. The magnetic field sensor 170 may be a linear hall effect integrated circuit sensor, or the like. The magnetic field sensor 170 may include one or more wires 194 configured to convey the one or more electrical signals from the magnetic field sensor 170 to an electronic control unit, for example, and to convey power and/or data signals to the magnetic field sensor 170.

Figure 3:
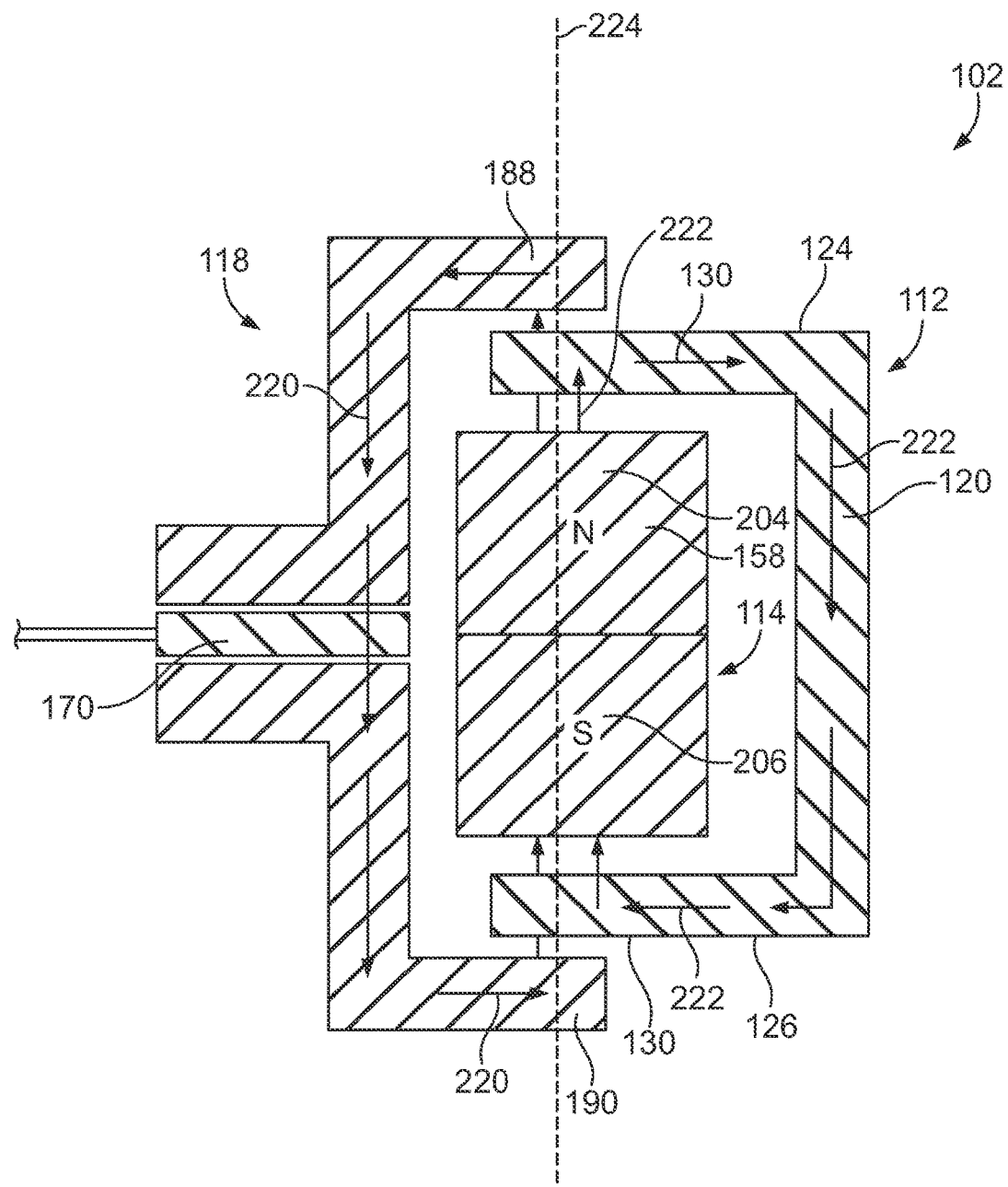
FIG. 3 is a cross-section of the relative angle sensor according to an embodiment.

FIG. 3 is a cross-section of the relative angle sensor 102 according to an embodiment. In FIG. 3, the upper bar 188 of the collector unit 118 is disposed axially above the upper stator ring 124 of the stator unit 112 such that the upper stator ring 124 is located between the upper bar 188 and the magnet unit 114. Similarly, the lower bar 190 of the collector unit 118 is disposed axially below the lower stator ring 126, such that the lower stator ring 126 between the lower bar 190 and the magnet unit 114. The magnet 158 has an axially oriented polarity with a north pole 204 disposed above a south pole 206 (for example, the north pole 204 is closer to the upper collector bar 188 than the south pole 206). Magnetic flux is routed outwards from the north pole 204 of the magnet 158 and is received by the magnet 158 at the south pole 206.

As used herein, magnetic flux from the magnet unit 114 is referred to as being routed along a detection path or a non-detection path, based on the relative rotational position of the stator unit 112 and the magnet unit 114. The detection path (shown by arrows 220) extends from the magnet unit 114, across one or more slots 132 (shown in FIG. 2) of either the upper or lower stator rings 124, 126, and through the collector unit 118, where the flux is detected by the magnetic field sensor 170. The flux along the detection path may be in one of two opposite directions. For example, the directions are clockwise and counter-clockwise. As shown in FIG. 3, since the north pole 204 of the magnet 158 is oriented above the south pole 206, the magnetic flux along the detection path is routed counter-clockwise from the north pole 204, across one or more slots 132 of the upper stator ring 124, into the upper bar 188, downwards through the collector unit 118, out of the lower bar 190, across one or more slots 132 of the lower stator ring 126, and into the south pole 206 of the magnet 158. If the magnet 158 has a reverse polarity, the magnetic flux along the detection path may be routed in the clockwise direction. As opposed to the detection path, the non-detection path (shown by arrows 222) routes magnetic flux from the magnet unit 114 either clockwise or counter-clockwise, depending on the polarity of the magnet 158, through the stator unit 112 and back to the magnet unit 114, without extending through the collector unit 118. For example, as shown in FIG. 3, the magnetic flux along the non-detection path is routed clockwise from the north pole 204, into and through one or more teeth 130 of the upper stator ring 124, downwards through the stator shaft 120, through and out of one or more teeth 130 of the lower stator ring 126, and into the south pole 206 of the magnet 158. Magnetic flux routed along the non-detection path is not routed through the collector unit 118, and therefore is not detected by the magnetic field sensor 170.

Figure 4A:
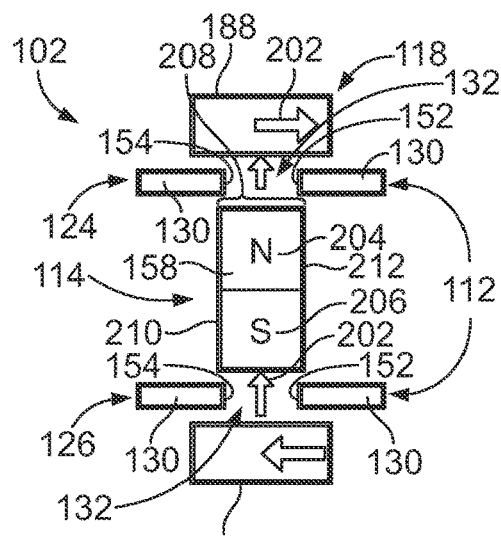
FIGS. 4A-4C are schematic diagrams of the relative angle sensor according to an embodiment.
Figure 4B:
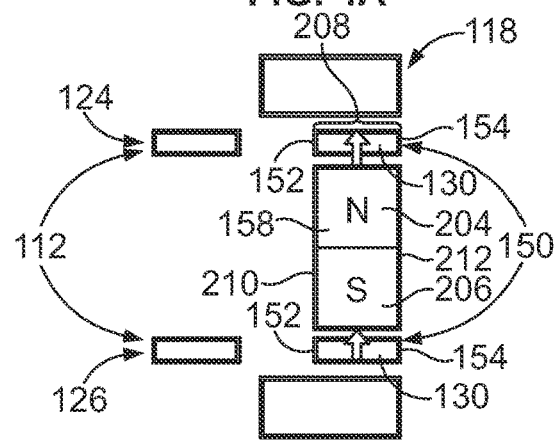
Figure 4C:
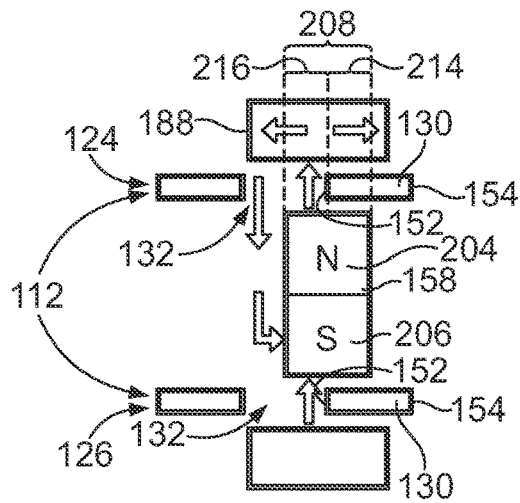

FIGS. 4A-4C are schematic diagrams of the relative angle sensor 102 according to an embodiment. The schematic diagrams show cross-sections of the cross-sectional view of the relative angle sensor 102 shown in FIG. 3 taken along line 224. The diagrams show one magnet 158 of the magnet unit 114, two teeth 130 of each of the upper and lower stator rings 124, 126 of the stator unit 112, and the upper and lower collector bars 188, 190 of the collector unit 118. Magnetic flux routed from the magnet 158 is shown by arrows 202.

In FIG. 4A, the magnet 158 is in an uncovered position relative to the stator unit 112. For example, the magnet 158 is in a rotational position relative to the stator unit 112 such that an entire width 208 of the magnet 158 is aligned with one slot 132 of each of the upper and lower stator rings 124, 126. The magnet 158 may align with the slots 132 such that left and right sides 210, 212 of the magnet 158 are between the right edge 154 of the tooth 130 to the left of each of the slots 132 and the left edge 152 of the tooth 130 to the right of each of the slots 132. Since the magnet 158 aligns with the slots 132, the magnet 158 is "uncovered" or not covered by the teeth 130. In one or more embodiments, the width of the slots 132 may be smaller than the width 208 of the magnet 158. In such case, the magnet 158 is in the uncovered position relative to the stator unit 112 when the magnet 158 fills the width of the slot 132, such that the left and right edges 152, 154 defining the slot 132 are between the left and right sides 210, 212 of the magnet 158. In an embodiment in which the width of the slots 132 is equal to the width 208 of the magnet 158, then the left side 210 of the magnet 158 may align with the right edge 154 of the left tooth 130 and the right side 212 may align with the left edge 152 of the right tooth 130 when the magnet 158 is in the uncovered position relative to the stator unit 112.

In the uncovered position, magnetic flux is routed from the north pole 204 of the magnet 158 along the detection path. For example, the magnetic flux is routed: across the slot 132 of the upper stator ring 124; into the upper bar 188 of the collector unit 118; through the collector unit 118 and across the magnetic field sensor 170 (shown in FIG. 3); out of the lower bar 190; across the slot 132 of the lower stator ring 126; and into the south pole 206 of the magnet 158. In the uncovered position, the magnitude of magnetic flux routed from the magnet 158 along the detection path is a maximum value, as compared to the magnitude of magnetic flux from the magnet 158 at other relative rotational positions between the magnet unit 114 and the stator unit 112. Thus, when the magnet 158 is in the uncovered position, a detected magnitude (or density) of magnetic flux by the magnetic field sensor 170 is at a maximum amount. It is understood that magnitude may be positive or negative, depending on the direction of routing of the magnetic flux. For example, assuming that the magnetic flux shown in FIG. 4A is detected as a maximum positive value (or maximum magnitude in the positive direction), if the magnet 158 has the reverse polarity (such that the north pole 204 is below the south pole 206 in the diagram), the magnetic flux would be detected as having a maximum negative value (or maximum magnitude in the negative direction).

In FIG. 4B, the magnet 158 is in a covered position relative to the stator unit 112. For example, the magnet 158 is in a rotational position relative to the stator unit 112 such that the entire width 208 of the magnet 158 is aligned with one tooth 130 of each of the upper and lower stator rings 124, 126 (or with one pair 150 of teeth 130). The left and right sides 210, 212 of the magnet 158 may be between the left and right edges 152, 154 of each tooth 130 in the pair 150. Thus, the magnet 158 is "covered" by the teeth 130. In one or more embodiments, the width of the teeth 130 may be smaller than the width 208 of the magnet 158. In such case, the magnet 158 is in the covered position when the left and right edges 152, 154 of the tooth 130 are between the left and right sides 210, 212 of the magnet 158. In an embodiment in which the width 208 of the magnet 158 equals the width of each tooth 130, the left side 210 of the magnet 158 may align with the left edge 152 of the tooth 130, and the right side 212 may align with the right edge 154 when the magnet 158 is in the covered position relative to the stator unit 112.

In the covered position, the teeth 130 block the magnetic flux from being routed along the detection path. Instead, magnetic flux is routed along the non-detection path shown in FIG. 3. Therefore, the magnetic flux from the north pole 204 of the magnet 158 is routed into the tooth 130 of the upper stator ring 124, through the stator shaft 120 (shown in FIG. 3), out of the tooth 130 of the lower stator ring 126, and into the south pole 206 of the magnet 158. The magnetic flux is not routed through the collector unit 118, so the detected magnitude of the magnetic flux by the magnetic field sensor 170 (shown in FIG. 3) is a minimum value.

In FIG. 4C, the magnet 158 is in a partially covered position relative to the stator unit 112. For example, the magnet 158 is in a rotational position relative to the stator unit 112 such that a first portion 214 of the width 208 of the magnet 158 is rotationally aligned between the left and right edges 152, 154 of one tooth 130 of each of the upper and lower stator rings 124, 126, and a second portion 216 of the width 208 is rotationally aligned within one slot 132 of each of the upper and lower stator rings 124, 126. Thus, the magnet 158 is only "partially covered" by the teeth 130. In the partially covered position, the magnitude of magnetic flux routed from the magnet 158 along the detection path through the collector unit 118 is an intermediate value or a minimum value. For example, some magnetic flux may be routed across the slots 132 along the detection path, while other magnet flux may be routed through the teeth 130 along the non-detection path. Therefore, less magnetic flux is routed through the collector unit 118 than in the uncovered position, so the magnitude of detected flux is reduced to an intermediate level or to the minimum level. In addition, even some of the magnetic flux that is received at the upper bar 188 of the collector unit 118 may not be routed through the magnetic field sensor 170 (shown in FIG. 3). For example, at least some magnetic flux routed upwards from the north pole 204 of the magnet 158 across the slot 132 of the upper stator ring 124 may extend back downwards across the same slot 132 and into the south pole of an adjacent magnet (not shown) or into the south pole 206 of the magnet 158. Thus, it is possible that a minimum value of magnetic flux (routed from the magnet 158) is detected by the magnetic field sensor 170 in the partially covered position of the magnet 158.

Figure 6:
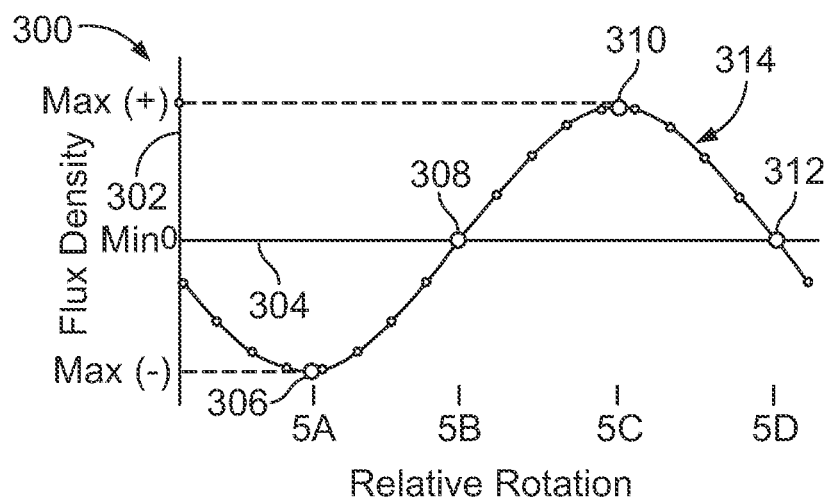
FIG. 6 is a graph plotting magnetic flux over relative rotational positions between the stator unit and the magnet unit according to an embodiment.

FIGS. 5A-5D are additional schematic diagrams of the relative angle sensor 102 according to an embodiment. The diagrams shown in FIGS. 5A-5D are similar to the diagrams shown in FIGS. 4A-4C, except two magnets are shown in the magnet unit 114—a first magnet 158 and an adjacent second magnet 160. The first and second magnets 158, 160 have opposite axial polarities. For example, the north pole 204 of the first magnet 158 is proximate to the upper bar 188 of the collector unit 118, and the south pole 206 of the first magnet 158 is proximate to the lower bar 190, while the north pole 204 of the second magnet 160 is proximate to the lower bar 190, and the south pole 206 is proximate to the upper bar 188. FIGS. 5A-5D show multiple relative rotational positions between the stator unit 112 and the magnet unit 114. FIG. 6 is a graph 300 plotting magnetic flux 302 over relative rotational positions 304 between the stator unit 112 and the magnet unit 114 according to an embodiment. The magnetic flux detected by the magnetic field sensor 170 (shown in FIG. 2) at each of the relative rotational positions shown in FIGS. 5A-5D is indicated in the graph of FIG. 6.

In FIG. 5A, the relative rotational position between the stator unit 112 and the magnet unit 114 has the first magnet 158 in an uncovered position and the second magnet 160 in a covered position. Since the first magnet 158 is uncovered relative to the stator unit 112, the magnetic flux from the first magnet 158 is routed along the detection path through the collector unit 118 and is detected by the magnetic field sensor 170 (shown in FIG. 2). Since the second magnet 160 is covered relative to the stator unit 112, the magnetic flux from the second magnet 160 is routed along the non-detection path through the stator unit 112. Therefore, the magnetic field sensor 170 only detects magnetic flux from the first magnet 158 in the illustrated relative position. The magnetic flux routed through the collector unit 118 and detected by the magnetic field sensor 170 has a maximum magnitude in a first direction. For example, the first direction extends upwards from the north pole 204 of the first magnet 158, downwards through the collector unit 118 and across the magnetic field sensor 170, and upwards into the south pole 206 of the first magnet 158. The magnetic flux at the relative rotational position shown in FIG. 5A is represented in the graph 300 of FIG. 6 at point 306. Point 306 indicates a maximum magnitude in a first direction, where the first direction is plotted in a negative quadrant.

In FIG. 5B, both the first and second magnets 158, 160 are in partially covered positions. For example, the first and second magnets 158, 160 are equally aligned with the same set of slots 132 of the stator unit 112, such that a crease or interface 218 between the magnets 158, 160 bisects the slots 132 in the set. The magnetic flux routed through the collector unit 118 and detected by the magnetic field sensor 170 (shown in FIG. 2) at the relative rotational position shown in FIG. 4B has a minimum magnitude. The minimum magnitude may be zero or a negligible value, such that no direction of flux is detected. This effect may be due to magnetic flux from the north pole 204 of the first magnet 158 being routed upwards across the slot 132 in the upper stator ring 124 into the upper bar 188, then routed back downwards across the slot 132 into the south pole 206 of the second magnet 160, without being routed across the magnetic field sensor 170. In addition, magnetic flux from the north pole 204 of the second magnet 160 may be routed downwards across the slot 132 in the lower stator ring 126 into the lower bar 190, then routed back upwards across the slot 132 into the south pole 206 of the first magnet 158, also without being routed across the magnetic field sensor 170. Although at least some magnetic flux may be routed across the magnetic field sensor 170, the magnetic flux from the first magnet 158 is in an opposite direction as the magnetic flux from the second magnet 160, which cancel out at the magnetic field sensor 170, providing a negligible net magnetic flux. The magnetic flux at the relative rotational position shown in FIG. 5B is represented in the graph 300 of FIG. 6 at point 308. Point 308 indicates a minimum magnitude, where minimum magnitude is shown as zero flux.

In FIG. 5C, the first magnet 158 is in an uncovered position and the second magnet 160 in an uncovered position relative to the stator unit 112. Since the second magnet 160 is uncovered, magnetic flux from the north pole 204 of the second magnet 160 is routed along the detection path through the collector unit 118 for detection by the magnetic field sensor 170 (shown in FIG. 2). On the other hand, magnetic flux from the first magnet 158, which is covered, is routed along the non-detection path through the stator unit 112. Since the first and second magnets 158, 160 have opposite polarities, the magnetic flux routed through the collector unit 118 is in an opposite, second direction from the first direction of magnetic flux shown in FIG. 4A. The magnetic flux routed through the collector unit 118 and detected by the magnetic field sensor 170 has a maximum magnitude in the second direction. The magnetic flux at the relative rotational position shown in FIG. 5C is represented in the graph 300 of FIG. 6 at point 310. Point 310 indicates a maximum magnitude in the second direction, where the second direction is plotted in a positive quadrant.

In FIG. 5D, the first and second magnets 158, 160 are in partially covered positions. For example, the first and second magnets 158, 160 are equally aligned with the same pair 150 of teeth 130 of the stator unit 112, such that the crease or interface 218 between the magnets 158, 160 bisects the teeth 130 in the pair 150. The magnetic flux routed through the collector unit 118 and detected by the magnetic field sensor 170 (shown in FIG. 2) at the relative rotational position shown in FIG. 5D has a minimum magnitude. For example, at least some of the magnetic flux from each of the magnets 158, 160 is routed along the non-detection route through the stator unit or is routed along sub-paths, like the paths of the flux shown in FIG. 5B. Furthermore, the magnetic flux that does get routed through the collector unit 118 likely cancels out due to the flux being routed in both the first and the second directions. The magnetic flux at the relative rotational position shown in FIG. 5D is represented in the graph 300 of FIG. 6 at point 312. Point 312 indicates a minimum magnitude, similar to point 308.

Referring now to FIG. 6 alone, the plot line 314 of the detected magnetic flux in the graph 300 forms an oscillating wave pattern. Any change in the relative rotational position between the stator unit 112 (shown in FIG. 2) and the magnet unit 114 (FIG. 2) moves the point representing a current detected magnetic flux left or right along the wave pattern. The wave pattern may be associated with quantitative coordinates, such that the locations and changes in locations of the point (representing the current detected magnetic flux) along the wave pattern are quantifiable. The magnetic field sensor 170 (shown in FIG. 2) may be configured to send one or more electrical signals to an electronic control unit, where the electrical signals provide quantifiable values for the relative rotational position between the stator unit 112 and the magnet unit 114, including changes in the relative rotational position.

Figure 7:
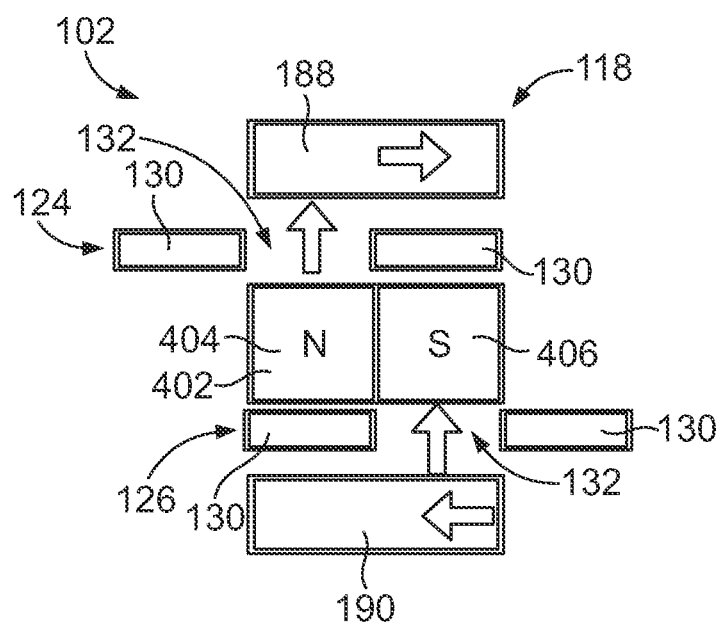
FIG. 7 is a schematic diagram of the relative angle sensor according to an alternative embodiment.

FIG. 7 is a schematic diagram of the relative angle sensor 102 according to an alternative embodiment. The relative angle sensor 102 is shown with one magnet 402 that has a lateral or circumferential polarity, such that the north pole 404 is that same axial or vertical distance from the upper bar 188 as the south pole 406 of the magnet 402. In this embodiment, the teeth 130 of the upper stator ring 124 are staggered with the teeth 130 of the lower stator ring 126, such that teeth 130 of the upper stator ring 124 align (laterally and/or rotationally) with slots 132 of the lower stator ring 126, and vice-versa. Magnetic flux from the north pole 404 of the magnet 402 is routed across the slot 132 of the upper stator ring 124, into the upper bar 188 of the collector unit 118, across the magnetic field sensor 170 (shown in FIG. 2), through the lower bar 190, across the slot 132 of the lower stator ring 126, and back into the south pole 406 of the magnet 402.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35

U.S.C. § 112(f), unless and until such claim limitations expressly use the phrase "means for" followed by a statement of function void of further structure.

What is claimed is:

1. A relative angle sensor comprising:
 a stator unit including a stator shaft oriented about a center axis, an upper stator ring coupled to the stator shaft, and a lower stator ring coupled to the stator shaft at a spaced apart location from the upper stator ring such that the stator shaft extends between the upper and lower stator rings, the stator unit defining a channel between the upper and lower stator rings and radially outside of the stator shaft, each of the upper and lower stator rings including a plurality of teeth with slots defined between adjacent teeth;
 a magnet unit including at least one magnet, the magnet unit disposed in the channel, at least one of the magnet unit or the stator unit configured to rotate about the center axis relative to the other of the magnet unit and the stator unit; and
 a collector unit configured to receive magnetic flux routed from the magnet unit, at least one of a magnitude or a direction of the magnetic flux that is routed through the collector unit from the magnet unit being responsive to a relative rotational position between the magnet unit and the stator unit.

2. The relative angle sensor of claim 1, wherein the collector unit includes an upper collector arm, a lower collector arm, and a magnetic field sensor that is configured to detect the magnitude and the direction of magnetic flux through the collector unit, the upper and lower collector arms defining a sensing area therebetween, the magnetic field sensor disposed in the sensing area.

3. The relative angle sensor of claim 1, wherein the collector unit has an upper collector arm and a lower collector arm, a distal end of the upper collector arm including an elongated first bar disposed axially above the upper stator ring such that the upper stator ring is disposed vertically between the first bar and the magnet unit, a distal end of the lower collector arm including an elongated second bar disposed axially below the lower stator ring such that the lower stator ring is disposed vertically between the second bar and the magnet unit.

4. The relative angle sensor of claim 1, wherein the teeth of the upper and lower stator rings extend radially outward relative to the center axis, the teeth and the slots of the upper stator ring being aligned with the teeth and the slots, respectively, of the lower stator ring.

5. The relative angle sensor of claim 1, wherein the at least one magnet of the magnet unit includes a first magnet and a second magnet that are both polarized in an axial direction, the first magnet being adjacent to the second magnet and having an opposite polarity than the second magnet.

6. The relative angle sensor of claim 1, wherein the upper and lower stator rings each define an inside arc and an outside arc, the inside arcs engaging the stator shaft, the outside arcs being defined by distal edges of the teeth, the slots of the upper and lower stator rings extending from the outside arc toward the inside arc.

7. The relative angle sensor of claim 1, wherein the stator unit does not mechanically contact the magnet unit.

8. The relative angle sensor of claim 1, wherein the stator shaft, the upper stator ring, and the lower stator ring of the stator unit are each formed of at least one ferrous material such that the stator unit provides a route for magnetic flux between the upper and lower stator rings through the stator shaft.

9. The relative angle sensor of claim 1, wherein the magnet unit is configured to be fixed to a first shaft and the stator unit is configured to be fixed to a second shaft that is coaxial with the first shaft, the relative rotational position between the magnet unit and the stator unit indicating a relative rotational position between the first shaft and the second shaft.

10. The relative angle sensor of claim 1, wherein the slots of the stator unit provide a detection path for magnetic flux that extends from the magnet unit, across the slots, and through the collector unit before returning to the magnet unit, the teeth of the stator unit providing a non-detection path for magnetic flux that extends from the magnet unit, through the teeth, and along the stator shaft before returning to the magnet unit.

11. The relative angle sensor of claim 1, wherein, when a first magnet of the magnet unit is in a covered position relative to the stator unit, the first magnet is aligned between first and second edges of one tooth of each of the upper and lower stator rings, and the magnitude of magnetic flux routed from the first magnet along a detection path through the collector unit is a minimum value.

12. The relative angle sensor of claim 1, wherein, when a first magnet of the magnet unit is in an uncovered position relative to the stator unit, the first magnet is aligned within one slot of each of the upper and lower stator rings, and the magnitude of magnetic flux routed from the first magnet along a detection path through the collector unit is a maximum value.

13. The relative angle sensor of claim 12, wherein, when the first magnet is in the uncovered position, the direction of magnetic flux routed from the first magnet through the collector unit depends on an axial polarity of the first magnet relative to the collector unit.

14. The relative angle sensor of claim 1, wherein, when a first magnet of the magnet unit is in a partially covered position relative to the stator unit, a first portion of a width of the first magnet is aligned between first and second edges of one tooth of each of the upper and lower stator rings and a second portion of the width of the first magnet is aligned within one slot of each of the upper and lower stator rings, the magnitude of magnetic flux routed from the first magnet along a detection path through the collector unit is at least one of an intermediate value or a minimum value.

15. The relative angle sensor of claim 1, wherein the upper stator ring and the lower stator ring are each fixed in place relative to the stator shaft such that the upper and lower stator rings do not rotate relative to the stator shaft.

16. A relative angle sensor comprising:
 a stator unit including a stator shaft oriented about a center axis, an upper stator ring coupled to the stator shaft, and a lower stator ring coupled to the stator shaft at a spaced apart location from the upper stator ring such that the stator shaft extends between the upper and lower stator rings, the stator unit defining a channel between the upper and lower stator rings and radially outside of the stator shaft, each of the upper and lower stator rings including a plurality of radially-extending teeth with slots defined between adjacent teeth, the teeth of the upper stator ring being aligned in pairs with the teeth of the lower stator ring;
 a magnet unit including plural magnets including a first magnet and a second magnet that are each polarized in an axial direction, the first magnet adjacent to the second magnet and having an opposite polarity than the second magnet, the magnet unit disposed in the channel, at least one of the magnet unit or the stator unit configured to rotate about the center axis relative to the other of the magnet unit and the stator unit; and a collector unit configured to receive magnetic flux routed from the magnet unit, at least one of a magnitude or a direction of the magnetic flux routed through the collector unit from the magnet unit being responsive to a relative rotational position between the magnet unit and the stator unit, wherein the stator shaft, the upper stator ring, and the lower stator ring of the stator unit are each formed of at least one ferrous material such that the stator unit provides a route for magnetic flux between the upper and lower stator rings through the stator shaft.

17. The relative angle sensor of claim 16, wherein the collector unit includes an upper collector arm, a lower collector arm, and a magnetic field sensor that is configured to detect the magnitude and the direction of magnetic flux through the collector unit, the upper and lower collector arms defining a sensing area therebetween, the magnetic field sensor disposed in the sensing area.

18. The relative angle sensor of claim 16, wherein magnetic flux routed through the collector unit has a minimum magnitude when equal portions of widths of the first and second magnets at least one of align with one of the pairs of teeth or align with a set of the slots.

19. The relative angle sensor of claim 16, wherein magnetic flux routed through the collector unit has a maximum magnitude in a first direction when the first magnet is in an uncovered position relative to the stator unit and the second magnet is in a covered position relative to the stator unit.

20. The relative angle sensor of claim 19, wherein magnetic flux routed through the collector unit has a maximum magnitude in an opposite, second direction when the first magnet is in a covered position relative to the stator unit and the second magnet is in an uncovered position relative to the stator unit.

\* \* \* \* \*